United States Patent Office 3,773,747
Patented Nov. 20, 1973

3,773,747
SUBSTITUTED AZOXY BENZENE COMPOUNDS
Ralf Steinsträsser, Darmstadt, Germany, assignor to Merck Patent Gesellschaft mit beschränkter Haftung, Darmstadt, Germany
No Drawing. Filed Nov. 20, 1970, Ser. No. 91,522
Claims priority, application Germany, Mar. 28, 1970,
P 20 14 989.7
Int. Cl. C07c 105/00
U.S. Cl. 260—143
46 Claims

ABSTRACT OF THE DISCLOSURE

Azo and azoxy compounds of the formula

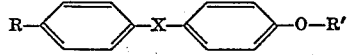

wherein X is azo or azoxy, R is straight-chain alkyl of 1–8 carbon atoms, and R' is straight-chain alkyl or straight-chain alkanoyl, each of 1–10 carbon atoms, in pure form and mixtures thereof with each other and with other nematic or non-nematic compounds, have nematic liquid-crystalline phases at low temperatures and exhibit wide nematic mesophases. In their nematic phase, their light scattering property varies proportionately and reversably to the voltage applied thereto, which renders them useful in the production of display screens in nuclear resonance and electron resonance spectroscopy and as solvents for stereospecific chemical reactions.

BACKGROUND OF THE INVENTION

This invention relates to novel azo and azoxy compounds, to nematic compositions comprising them and to processes for their production and use.

In the development of electronic components, especially electronic indicating devices which, in contrast to the conventional counting or cathode-ray tubes, are distinguished by flat construction and high contrast, inter alia, liquid crystals of nematic phase have been employed for several years as picture screen material. These compounds exhibit in their nematic range, i.e., the range between the melting point (M.P.) and the clear point (cl. p.), variable light scattering ability which is controllable by direct and alternating electric fields, which variability can be employed for the production of both black-and-white and multiple-color images.

For this purpose, a thin layer of a few μ thickness of a nematic compound is placed between two electrode plates as a dielectric; one or both electrode plates being transparent so that the thus-produced contrasts can be observed by direct or rear viewing.

The stilbene, azobenzene, azoxybenzene, benzoic acid and cinnamic acid derivatives or 6-alkoxynaphthoic acids-(2) employed heretofore for such experiments all exhibited the disadvantage that they display nematic properties only at temperatures above 70° C., so that the electronic component provided with liquid crystals thereof had to be heated and, in various cases, thermostated. Azomethines or mixtures of several azomethine derivatives also have been employed. Although these compounds exhibit nematic properties at about or below room temperature and maintain their nematic properties at temperatures (up to 100° C.), they have the disadvantages that they are exhausted after a period of being subjected to an electric field and they can readily be destroyed hydrolytically by traces of water, especially when the latter is dissociated in the electric field.

Nematic substances also play an important part as solvents in various physical-chemical determination methods, for example in proton nuclear reasonance spectroscopy wherein the dissolved substance, together with the nematic solvent, is aligned by the magnetic field employed for the measurement, which is not the case in the customary isotropic solvents, so that it is not only possible to recognize the position of protons or proton groups in the molecule, but to differentiate among so-called equivalent protons and to determine the linkage angles and linkage lengths of substituents. A similar effect is exerted by nematic solvents in connection with other modifications of nuclear resonance and electron resonance spectroscopy.

Nematic liquides are also employed as solvents for chemical reactions which produce sterically uniform reaction products.

In all cases where nematic liquids are employed as solvents, it is important that they are as inert as possible chemically, so that reactions with the dissolved substance are avoided. Although this requirement is met, for example, by the azo, azoxybenzene, p-alkoxybenzoic acid and -cinnamic acid derivatives employed heretofore, these compounds exhibit nematic properties only at temperatures of above 70° C., which is higher than desired for many chemical reactions. The low-melting nematic substances of the azomethine series have the disadvantage that they are chemically reactive.

It has now been found that the compounds of this invention, in pure form and mixtures thereof with each other and with other nematic or non-nematic compounds, have nematic liquid-crystalline phases at low temperatures and exhibit wide nematic mesophases. Several of these compounds or mixtures show nematic properties at room temperature. Furthermore, these substances or mixtures tend to form supercooled nematic phases. They are capable, when employed as picture screen material, of yielding high-contrast pictures. The compounds are substantially inert chemically and exhibit good chemical stability. For example, they are insensitive to water, acids, alkalis, and atmospheric oxygen. Consequently, they are highly suitable for all purposes for which other nematic substances have been employed heretofore, and usually are more suitable for such purposes than conventional nematic systems. They are especially suitable as solvents for nuclear resonance spectroscopy, for electron spin resonance spectroscopy and for chemical reactions.

OBJECTS OF THE INVENTION

It is an object of this invention to provide novel azo and azoxy compounds. Another object is the provision of nematic compositions comprising one or more novel compounds of this invention. Still another object is the provision of processes for the production of novel compounds of this invention. A still further object is the provision of structures comprising a coating of a nematic composition of this invention, an optically transparent support for the coating and electronic means for forming images thereon. Other objects of this invention will be apparent to those skilled in the art to which this invention pertains.

SUMMARY OF THE INVENTION

The compounds of this invention are azo and azoxy compounds of Formula I:

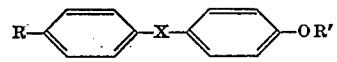    I wherein X is an azo group or an azoxy group, R is straight-chain alkyl of 1–8 carbon atoms, and R' is straight-chain alkyl or straight-chain alkanoyl, each of 1–10 carbon atoms. The nematic compositions of this invention comprise at least one and preferably a mixture of compounds of Formula I.

DETAILED DISCUSSION

Of the compounds of Formula I, preferred are those wherein:

(Ia) X is an azo group;
(Ib) X is an azoxy group;
(Ic) R is straight-chain alkyl of 2–4 carbon atoms;
(Id) R' is straight-chain alkyl of 1–6 carbon atoms;
(Ie) R' is straight-chain alkanoyl of 4–8 carbon atoms;
(If) Compounds defined by (Ic) wherein R' is straight-chain alkyl of 1–6 carbon atoms or straight-chain alkanoyl of 4–8 carbon atoms;
(Ig) Compounds as defined by (If) wherein X is an azoxy group;
(Ih) Compounds as defined by (Ig) wherein R is n-butyl.

In its composition aspect, this invention relates to nematic mixtures containing at least one compound and preferably at least two compounds of Formula I.

In its process aspect, this invention relates to a process for the preparation of compounds of Formula I in which:

(a) A compound of Formula II

is reacted with a compound of the formula R'OH or a functional derivative thereof; or (b) A nitroso compound of Formula IIIa or IIIb

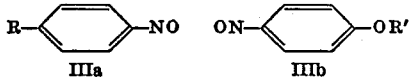

is reacted, respectively, with an amine of the Formula IVa or IVb

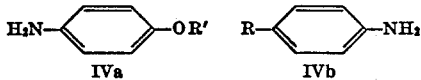

or with a mixture of amino compounds of Formulae IVa and IVb; or (c) A hydrazo compound of Formula V

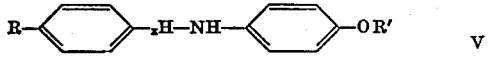

is oxidized with an oxidizing agent; or (d) A mixture of nitro compounds of Formulae VIa and VIb

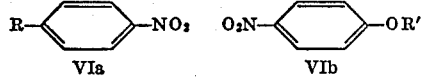

is reduced with a reducing agent; or (e) An amine of Formula IVa or IVb is diazotized and thereafter coupled, respectively, with a compound of Formula VIIa or VIIb

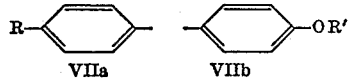

or (f) A nitroso compound of Formula IIIa or IIIb is reacted with a hydroxylamine of Formula VIIIa or VIIIb

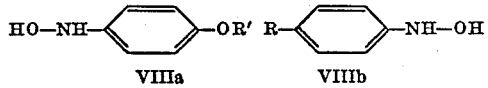

or, optionally, an azo compound of the Formula I, i.e., wherein X is —N=N—, is converted, by treatment with an oxidizing agent, into the corresponding azoxy compound of Formula I, i.e., wherein X is

The compounds of Formula I, especially the azoxy compounds, are obtained as substances having strictly defined melting points. Their melting points and their clear points are reproducible, although at least several of the azoxy compounds are not produced as a single compound but instead as a binary mixture of a p-R-p'-OR'-azoxybenzene and a p-OR'-p'-R-azoxybenzene. These azoxy compounds, including those of the examples set forth below, have been named as p-R-p'-OR'-azoxybenzenes, i.e., p-alkyl-p'-alkoxy- or p-alkyl-p'-alkanoyloxy-azoxybenzene, in which the nitrogen atom bearing the oxygen atom is attached to the benzene ring bearing the —OR' substituents. However, it is possible that in some instances the isomeric p-alkoxy-p'-alkyl- or p-alkanoyloxy-p'-alkyl-azoxybenzenes are produced or, in spite of their sharply defined melting points, a mixture of both isomers is produced. In any event, this invention is directed to both isomers as well as mixtures thereof, all of which have the hereinabove described utility as nematic compounds.

Preferably, the compounds of Formula I are obtainable by alkylation, i.e., etherification, or acylation, i.e., esterification, of the corresponding azo- or azoxyphenols of Formula II. The alkylation and acylation processes are conducted in accordance with conventional methods described in the literature.

Suitable alkylating agents are alcohols of the formula R'—OH wherein R' is alkyl as defined above, e.g., methanol, ethanol, n-propanol, n-butanol, n-pentanol, n-hexanol, n-heptanol, n-octanol, n-nonanol, and n-decanol, as well as the functional derivatives thereof. Such derivatives can be, for example, the corresponding halogenides, preferably the chloride, bromide or iodide, sulfuric acid esters, aryl- and alkylsulfonic acid esters, especially those wherein the aryl group contains 6–10 carbon atoms and the alkyl group contains 1–6 carbon atoms, e.g., the benzene-, p-toluene- and methanesulfonic acid esters, fluorosulfonic acid esters, and phosphoric acid esters of the above-mentioned alcohols. Also suitable as alkylating agents are diazoalkanes, e.g., diazomethane, diazoethane and diazopropane, and trialkyl oxonium tetrafluoborates, e.g., trimethyl-, triethyl-, tri-n-propyl- or tri-n-butyloxonium tetrafluoborate. Suitable solvents are, for example water; alcohols, e.g., methanol, ethanol, or isopropanol; ketones, e.g., acetone or butanone; amides, e.g., dimethylformamide; or sulfoxides, e.g., dimethyl sulfoxide; and ethers, e.g., diethyl ether, diisopropyl ether, tetrahydrofuran and dioxane. When an acid is formed during the etherification, e.g., a hydrohalic acid, it is advantageous to add a base in order to neutralize this acid. Suitable bases are, for example, alkali metal hydroxides, e.g., NaOH and KOH, alkaline earth metal hydroxides, e.g., Ca(OH)$_2$, alkali metal carbonates, e.g., sodium or potassium carbonate, and organic bases, preferably tertiary bases, e.g., heterocyclic aromatic, including pyridine and collidine, and trialkylamines, e.g., triethylamine.

It is also possible first to employ a salt, e.g., the sodium or potassium salt, of a phenol of Formula II for the reaction with the alkylating agent. The reaction temperatures for the alkylation can vary widely, e.g., between —20° C. and +150° C., preferably between room temperature and 130° C. The alkylation is normally complete in from 1 minute to 24 hours, depending on the reaction conditions.

Suitable acylating agents are acids of the formula R'—OH wherein R' is alkanoyl as defined above, e.g., acetic acid, propionic acid, butyric acid, valeric acid, caproic acid, enanthic acid, caprylic acid, perlargonic acid, capric acid, and the functional derivatives thereof. Such derivatives are the acid halides thereof, e.g., the chlorides and bromides, and the anhydrides thereof, as well as the ketenes derived from these acids. The esterification is conducted in accordance with methods described in the literature. Preferred esterification methods are those conducted with base catalysis. Suitable basic catalysts are, for example, the alkali metal hydroxides, e.g., sodium or potassium hydroxide; alkali metal carbonates, e.g., sodium carbonate and potassium carbonate; alkali metal bicarbonates, e.g., sodium bicarbonate and potassium bicarbonate; alkali metal acetates, e.g., sodium acetate or potassium acetate; basic alkaline earth metal compounds, e.g., calcium hydroxide; and organic bases, including trialkylamines, e.g., triethylamine, and heterocyclic aromatic amines, e.g., pyridine, lutidine, collidine and quinoline.

The esterification can be conducted in the absence of a solvent, for example, by heating the components with molten sodium acetate. However, it is more advantageous to conduct the reaction in the presence of a solvent. Suitable solvents are, for example, alcohols, e.g., methanol, ethanol, isopropanol, n-butanol; ketones, e.g., acetone, butanone; amides, e.g., dimethylformamide, hexamethylphosphoric acid triamide; and sulfoxides, e.g., dimethyl sulfoxide. It is also possible to employ an excess of the base as the solvent, e.g., aqueous or alcoholic, such as methanolic or ethanolic, sodium hydroxide or potassium hydroxide solutions, pyridine, or triethylamine. When the reaction is conducted in an aqueous medium, the pH is suitably maintained between about 7 and about 14.

The esterification is normally accomplished at temperatures of between about $-50°$ C. and $200°$ C., preferably between $-20°$ C. and $80°$ C. The reaction is ordinarily terminated after a reaction time of about 15 minutes to 48 hours.

An especially preferred embodiment resides in first converting a phenol of Formula II into the corresponding potassium salt, for example with ethanolic potassium hydroxide solution; suspending this salt in methanol or acetone; mixing the suspension with an alkali metal bicarbonate or carbonate, e.g., sodium bicarbonate or potassium carbonate; and adding, with stirring, the acid chloride or acid anhydride employed for the esterification, dissolved in acetone, in a dropwise manner. In this mode of operation, the reaction temperature is preferably between about $-20°$ C. and $+25°$ C., especially about $-15°$ C. Under these conditions, the esterification is usually terminated after about 15–50 minutes.

Azo compounds according to Formula I, i.e., wherein X is an azo group, can also be obtained by condensing a nitroso compound of Formula IIIa with an amine of Formula IVa, or a nitroso compound of Formula IIIb with an amine of Formula IVb. Preferred solvents for this reaction are aliphatic carboxylic acids, e.g., acetic acid, propionic acid and butyric acid. Reaction temperatures of between $30°$ C. and $100°$ C. and reaction times of between ½ and 6 hours are usually employed. It is also possible to employ a neutral solvent, e.g., toluene, xylene, or carbon tetrachloride, if an acidic catalyst, e.g., p-toluenesulfonic acid, sulfuric acid or polyphosphoric acid, is added thereto. This latter variation permits an azeotropic removal of the water liberated during the condensation. In this case, the preferred reaction temperature is the boiling temperature of the solvents employed.

Azo compounds corresponding to Formula I, i.e., wherein X is an azo group, can also be obtained by the oxidation of a mixture of amines of Formulae IVa and IVb. Especially suitable oxidizing agents are sodium perborate tetrahydrate in the presence of boric acid. Preferred solvents are aliphatic carboxylic acids, especially acetic acid. Preferred reaction temperatures are between 40 and $100°$ C. and preferred reaction times are between 1 and 12 hours. Suitable oxidizing agents are, for example, active manganese dioxide or nickel peroxide. The reaction is advantageously conducted in a neutral aromatic solvent, e.g., benzene, toluene, or xylene, preferably at its boiling temperature. In this reaction, both symmetrical and asymmetrical reaction products are formed, which can be readily separated by column chromatography, e.g., over aluminum oxide.

Compounds of Formula I can also be obtained by oxidizing the corresponding hydrazo compounds of Formula V, for example with air, oxygen, bromine, lead(IV)-compounds, e.g., lead dioxide or lead tetraacetate, or nitrobenzene. With the above-mentioned oxidizing agents, azo compounds of Formula I are usually obtained. In contrast thereto, if it is desired to obtain azoxy compounds, i.e., compounds of Formula I wherein X is an azoxy group, from the hydrazo compounds of Formula V, a peroxide, e.g., hydrogen peroxide, or peracids, e.g., perbenzoic acid or m-chloroperbenzoic acid, is preferably employed as the oxidizing agents. When the oxidation is conducted with air, oxygen or bromine, the reaction is conducted in an alkaline aqueous medium, e.g., in dilute solution of sodium hydroxide, preferably at a temperature of from 0 to $50°$ C., preferably at about room temperature. The oxidation with nitrobenzene is advantageously carried out with an excess of the latter as the solvent; and a reaction temperature of between 100 and $200°$ C. and a reaction time of between 1 and 4 hours is preferably employed.

Compounds of Formula I are also produced by reducing an equimolar mixture of the nitrobenzenes of Formulae VIa and VIb. Ordinarily, the azoxy compounds, i.e., compounds of Formula I wherein X is azoxy, are obtained in this reaction. Suitable reducing agents include sodium amalgam; alcohols, e.g., methanol, in the presence of an alkali; aldehydes, e.g., formaldehyde; glucose; metals, e.g., iron in the presence of an alkali, e.g., NaOH, magnesium, zinc and silicon; arsenites, e.g., sodium arsenite in an alkaline solution; hydrazines; and sodium sulfide. The reduction can also be conducted by electrolysis in an alkaline, e.g., NaOH medium, on lead electrodes. A preferred reducing agent is finely divided methanol-free sodium methylate in boiling xylene. The mixture of reaction products can readily be separated by means of chromatography, e.g., over aluminum oxide.

The azo compounds of Formula I are also obtained by the diazotization of an amine of Formula IVa or IVb, suitably in a mineral-acid solution, e.g., hydrochloric acid solution, with sodium nitrite or with an organic nitrite, e.g., isoamyl nitrite, and subsequent coupling of the resulting diazonium salt with an alkylbenzene of Formula VIIa or a phenyl ether or phenyl ester of Formula VIIb, respectively. Since the coupling components are insoluble in the aqueous acidic solution of the diazonium salts, it is advantageous to produce an emulsion by vigorous stirring, which emulsion effects contact between the two reactants. However, it is also possible to employ solubilizers, e.g., an aliphatic alcohol, preferably n-butanol.

The azoxy compounds of Formula I are also obtained by condensing a nitroso compound of Formula IIIa or IIIb with a hydroxylamine of Formula VIIIa or VIIIb, respectively. This condensation is suitably conducted in an alkaline-alcoholic medium, preferably in ethanolic potassium or sodium hydroxide solution, at the boiling point of the reaction mixture. The reaction is normally complete in 1–4 hours.

If desired, azo compounds of Formula I (X=azo group) can be converted into the corresponding azoxy compounds (I, X=azoxy group) by means of oxidation. Oxidizing agents suitable for this purpose are, for example, peroxides, e.g., hydrogen peroxide, dibenzoyl peroxide; peracids, e.g., peracetic acid, perbenzoic acid and m-chloroperbenzoic acid. Suitable solvents are, for example, aliphatic carboxylic acids, e.g., acetic acid, propionic acid, butyric acid or valeric acid; chlorinated hydrocarbons, e.g., carbon tetrachloride, tetrachloroethane, methylene chloride and chloroform; and dialkyl ethers, e.g., diethyl ether, dipropyl ether and di-n-butyl ether. The oxidation reactions are preferably conducted at temperatures of between $-20°$ C. and $100°$ C. or the boiling point of the solvent employed. The reaction times normally range between 20 minutes and 24 hours.

The nematic mixtures of this invention can contain two, three or more than three components, and among these, one, two or more compounds of Formula I. The melting point of these mixtures is preferably lower than the melting point of the individual components, e.g., between about −20° C. and +110° C., preferably below 55° C. and more preferably below 25° C. so that the mixtures can be used at room temperature. The clear point, i.e., the liquid to mesophase transition point of these mixtures, ranges between about 40 and about 130° C., preferably between 50 and 125° C. Especially preferred are mixtures having a melting point below 25° C. and a clear point between about 70 and 120° C. These mixtures thus exhibit a nematic range of at least 65–95° C., preferably at least about 80° C. However, mixtures having a nematic range of at least 30° C. are likewise usable. Preferably eutectic mixtures are employed.

The nematic mixtures of this invention can contain, in addition to one or more compounds of Formula I, one or more of the following:

Hydrocarbons, e.g., diphenyl, diphenylmethane, trans-stilbene, diphenylacetylene and the 4- or 4'-substituted or 4,4'-disubstituted derivatives thereof, e.g., 4,4'-dimethoxydiphenyl, 4,4'-dimethoxydiphenylmethane, 4-ethoxy-4' - methoxydiphenylmethane, 4,4' - dimethoxy - trans-stilbene, 4 - ethyl - 4' - methoxydiphenyl, 4-ethyl-4'-methoxy - trans - stilbene, 4,4'-dimethoxydiphenylacetylene; naphthalene and the 2,6-substituted derivatives thereof, e.g., 2 - ethoxy - 6 - propoxynaphthalene; ethers, e.g., diphenyl ether and the 4- or 4'-substituted or 4,4'-disubstituted derivatives thereof, e.g., 4,4'-dimethoxydiphenyl ether, 4-ethoxy-4' - propionyloxydiphenyl ether, 4,4' - diphenyloxydiphenyl ether and the corresponding thioethers; Schiff bases, e.g., benzylidene aniline and the 4- or 4'-substituted or 4,4'-disubstituted derivatives thereof, especially N-(4-alkoxy - benzylidene) - anilines, e.g., N-(4-methoxybenzylidene) - aniline, N-benzylidene - 4-alkoxy anilines, e.g., N-benzylidene-4-methoxyaniline, N - (4-alkoxybenzylidene) - 4 - alkoxy anilines, e.g., N-(4-methoxybenzylidene) - 4 - methoxyaniline, N - (4-alkoxybenzylidene) - 4 - acyloxy anilines, e.g., N-(4-methoxybenzylidene) - 4 - acetoxyaniline, N - (4-alkoxybenzylidene) - 4 - alkyl anilines, e.g., N - (4-methoxybenzylidene) - 4 - n - butylaniline, N-(4-n-butoxybenzylidene)-p - toluidine, 4 - (4 - alkoxybenzylideneamino)-α-methylcinnamic acid esters, e.g., the methyl ester of 4 - (4-methoxybenzylideneamino) - α - methylcinnamic acid, 4-(4 - alkoxybenzylideneamino) - phenyl carbonates, e.g., 4 - (4 - methoxybenzylideneamino) - phenyl - ethyl carbonate; azo compounds, e.g., azobenzene and the 4- or 4'-substituted and 4,4' - disubstituted derivatives thereof, e.g., 4 - ethoxy - 4' - capronyloxyazobenzene, 4,4'-dimethoxyazobenzene and 4 - methoxy - 4' - ethoxycarbonylazobenzene; azoxy compounds, e.g., azoxybenzene and the 4- or 4'-substituted and 4,4'-disubstituted derivatives thereof, e.g., 4,4' - dimethoxyazoxybenzene and 4-methoxy - 4' - acetoxyazoxybenzene; azines, e.g., benzalazine and the 4- or 4'-substituted and 4,4'-disubstituted derivatives thereof, e.g., 4,4' - dimethoxybenzalazine; steroids, especially 3 - hydroxy - steroids, e.g., cholesterol and stigmasterol and the esters of both, e.g., cholesteryl-3-acylates, e.g., cholesteryl-2-acetate and the homologs thereof, and cholesteryl-3-carbonates, e.g., cholesterylmethyl carbonate, cholesteryl-ethyl carbonate, cholesteryloleyl carbonate, and other compound or compounds which, with one or more compounds of Formula I, provide a nematic composition.

Of the nematic mixtures of the present invention, preferred are those which contain at least two compounds of Formula I. Mixtures which contain p-n-butyl-p'-methoxyazoxybenzene (or its isomer, p-methoxy-p'-n-butylazoxybenzene) preferably in an amount of 30–80 and especially 50–70% by weight, and at least one further compound of Formula I, preferably in an amount of 20–70 and especially 30–50% by weight, exhibit particularly advantageous properties.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, the temperatures are set forth in degrees centigrade.

EXAMPLE 1

(a) 51 g. p-n-butyl-p'-hydroxyazobenzene (M.P. 78°; obtainable by the diazotization of p-n-butylaniline and subsequent coupling with phenol) is dissolved in 100 ml. of 10% sodium hydroxide solution and agitated for 3 hours at room temperature together with 25 g. of dimethyl sulfate (or an equivalent amount of another methylating agent, such as methyl bromide, methyl iodide, methyl-p-toluenesulfonate, or trimethyl phosphate). During this time, p-n-butyl-p'-methoxyazobenzene precipitates quantitatively; M.P. 31°, cl. p. 47° (from ethanol).

Analogously, using the following starting compounds:

p-methyl-p'-hydroxyazobenzene (M.P. 151°)
p-ethyl-p'-hydroxyazobenzene (M.P. 113°)
p-n-propyl-p'-hydroxyazobenzene (M.P. 83°)
p-n-butyl-p'-hydroxyazobenzene (M.P. 78°)
p-n-pentyl-p'-hydroxyazobenzene (M.P. 79°)
p-n-hexyl-p'-hydroxyazobenzene
p-n-heptyl-p'-hydroxyazobenzene
p-n-octyl-p'-hydroxyazobenzene the following products are obtained by alkylation with, for example, dimethyl, diethyl, di-n-propyl, or di-n-butyl sulfate, methyl, ethyl, n-propyl, n-butyl, n-pentyl, n-hexyl, n-heptyl, p-n-octyl, p-n-nonyl, or p-n-decyl chloride, bromide, or iodide; or with the corresponding sulfonic acid alkyl esters, e.g. methyl benzene sulfonate:

p-methyl-p'-methoxyazobenzene, M.P. 111°; cl. p. 64°
p-methyl-p'-ethoxyazobenzene, M.P. 118°; cl. p. 87°
p-methyl-p'-n-butoxyazobenzene, M.P. 76°; cl. p. 73°
p-ethyl-p'-methoxyazobenzene, M.P. 79°; cl. p. 37°
p-ethyl-p'-ethoxyazobenzene, M.P. 97°; cl. p. 60°
p-ethyl-p'-n-propoxyazobenzene
p-ethyl-p'-n-butyloxyazobenzene, M.P. 69°; cl. p. 67°
p-ethyl-p'-n-pentyloxyazobenzene
p-n-propyl-p'-methoxyazobenzene, M.P. 60°; cl. p. 69°
p-n-propyl-p'-ethoxyazobenzene, M.P. 88°; cl. p. 100°
p-n-propyl-p'-n-propoxyazobenzene
p-n-propyl-p'-n-butyloxyazobenzene
p-n-propyl-p'-n-pentyloxyazobenzene
p-n-butyl-p'-ethoxyazobenzene, M.P. 48°; cl. p. 83°
p-n-butyl-p'-n-propoxyazobenzene, M.P. 66°; cl. p. 67°
p-n-butyl-p'-n-butyloxyazobenzene, M.P. 60°; cl. p. 75°
p-n-butyl-p'-n-pentyloxyazobenzene, M.P. 42.5°; cl. p. 65.5°
p-n-butyl-p'-n-hexyloxyazobenzene, M.P. 44°; cl. p. 74°
p-n-butyl-p'-n-heptyloxyazobenzene
p-n-butyl-p'-n-octyloxyazobenzene
p-n-butyl-p'-n-nonyloxyazobenzene
p-n-butyl-p'-n-decyloxyazobenzene
p-n-pentyl-p'-methoxyazobenzene, M.P. 39°; cl. p. 65°
p-n-pentyl-p'-ethoxyazobenzene, M.P. 73°; cl. p. 92°
p-n-pentyl-p'-n-propoxyazobenzene, M.P. 55°; cl. p. 73°
p-n-pentyl-p'-n-butyloxyazobenzene, M.P. 66°; cl. p. 85.5°
p-n-pentyl-p'-n-pentyloxyazobenzene
p-n-hexyl-p'-methoxyazobenzene, M.P. 39.5°; cl. p. 51°
p-n-hexyl-p'-ethoxyazobenzene, M.P. 41°; cl. p. 55°
p-n-hexyl-p'-n-propoxyazobenzene, M.P. 42°; cl. p. 56° p-n-hexyl-p'-n-butyloxyazobenzene, M.P. 43.5°; cl. p. 66.5°
p-n-hexyl-p'-n-pentyloxyazobenzene
p-n-heptyl-p'-methoxyazobenzene
p-n-heptyl-p'-ethoxyazobenzene
p-n-heptyl-p'-n-propoxyazobenzene
p-n-heptyl-p'-n-butyloxyazobenzene
p-n-heptyl-p'-n-pentyloxyazobenzene
p-n-octyl-p'-methoxyazobenzene.

(b) 32 g. of p-n-butyl-p'-methoxyazobenzene is dissolved in 80 ml. of glacial acetic acid and mixed with 10 ml. of 30% aqueous hydrogen peroxide solution. The mixture is heated for 3 hours to 80° and then allowed to cool. The thus-separated oil is removed from the reaction mixture, dissolved in 50 ml. of hot ethanol, and the solution is cooled to −15°, thus obtaining a mixture of p-n-butyl-p'-methoxyazoxybenzene and p-methoxy-p'-n-butylazoxybenzene, M.P. 16.5°, cl. p. 76 (from ethanol).

Analogously, the following p-alkyl-p'-alkoxyazoxybenzenes (or the isomeric p-alkoxy-p'-alkylazoxybenzenes) are obtained by oxidation of the p-alkyl-p'-alkoxyazobenzenes set forth in (a) above:

p-methyl-p'-methoxyazoxybenzene
p-methyl-p'-ethoxyazoxybenzene
p-methyl-p'-n-butoxyazoxybenzene, M.P. 62°; cl. p. 96°
p-ethyl-p'-methoxyazoxybenzene, M.P. 37°; cl. p. 71°
p-ethyl-p'-ethoxyazoxybenzene, M.P. 57°; cl. p. 97°
p-ethyl-p'-n-propoxyazoxybenzene
p-ethyl-p'-n-butyloxyazoxybenzene, M.P. 44°; cl. p. 84°
p-ethyl-p'-n-pentyloxyazoxybenzene
p-n-propyl-p'-methoxyazoxybenzene, M.P. 46°; cl. p. 72°
p-n-propyl-p'-ethoxyazoxybenzene, M.P. 61°; cl. p. 115°
p-n-propyl-p'-n-propoxyazoxybenzene
p-n-propyl-p'-n-butyloxyazoxybenzene, M.P. 44°; cl. p. 84°
p-n-propyl-p'-n-pentyloxyazoxybenzene
p-n-butyl-p'-ethoxyazoxybenzene, M.P. 55.5°; cl. p. 99°
p-n-butyl-p'-n-propoxyazoxybenzene, M.P. 39°; cl. p. 78°
p-n-butyl-p'-n-butyloxyazoxybenzene, M.P. 37°; cl. p. 91°
p-n-butyl-p'-n-pentyloxyazoxybenzene, M.P. 38°; cl. p. 84.5°
p-n-butyl-p'-n-hexyloxyazoxybenzene, M.P. 28.5°; cl. p. 92°
p-n-butyl-p'-n-heptyloxyazoxybenzene
p-n-butyl-p'-n-octyloxyazoxybenzene
p-n-butyl-p'-n-nonyloxyazoxybenzene
p-n-butyl-p'-n-decyloxyazoxybenzene
p-n-pentyl-p'-methoxyazoxybenzene, M.P. 39°; cl. p. 89°
p-n-pentyl-p'-ethoxyazoxybenzene, M.P. 36°; cl. p. 111°
p-n-pentyl-p'-n-propoxyazoxybenzene, M.P. 45°; cl. p. 91°
p-n-pentyl-p'-n-butyloxyazoxybenzene, M.P. 40°; cl. p. 102°
p-n-pentyl-p'-n-pentyloxyazoxybenzene
p-n-hexyl-p'-methoxyazoxybenzene, M.P. 34°; cl. p. 77°
p-n-hexyl-p'-ethoxyazoxybenzene, M.P. 38°; cl. p. 91.5°
p-n-hexyl-p'-n-propoxyazoxybenzene, M.P. 29.5°; cl. p. 91°
p-n-hexyl-p'-n-butyloxyazoxybenzene, M.P. 27°; cl. p. 90.5°
p-n-hexyl-p'-n-pentyloxyazoxybenzene
p-n-heptyl-p'-methoxyazoxybenzene
p-n-heptyl-p'-ethoxyazoxybenzene
p-n-heptyl-p'-n-propoxyazoxybenzene
p-n-heptyl-p'-n-butyloxyazoxybenzene
p-n-heptyl-p'-n-pentyloxyazoxybenzene
p-n-octyl-p'-methoxyazoxybenzene.

(c) Analogously, the p-alkyl-p'-alkoxyazoxybenzenes (or the isomeric p-alkoxy-p'-alkylazoxybenzenes) set forth in paragraph (b) are obtained from the compounds set forth hereinbelow (or from the isomeric p-hydroxy-p'-alkylazoxybenzenes), by means of alkylation according to (a):

p-methyl-p'-hydroxyazoxybenzene
p-ethyl-p'-hydroxyazoxybenzene
p-n-propyl-p'-hydroxyazoxybenzene
p-n-butyl-p'-hydroxyazoxybenzene, M.P. 69.5°
p-n-pentyl-p'-hydroxyazoxybenzene
p-n-hexyl-p'-hydroxyazoxybenzene
p-n-heptyl-p'-hydroxyazoxybenzene
p-n-octyl-p'-hydroxyazoxybenzene.

EXAMPLE 2

A suspension of 25 g. of p-n-butyl-p'-hydroxyazobenzene in 100 ml. of absolute ether is mixed with a solution of 0.1 mol of diazomethane in 50 ml. of absolute ether (produced from 28 g. of p-toluenesulfonylmethyl nitrosamide). Under the evolution of nitrogen, p-n-butyl-p'-methoxyazobenzene is quantitatively obtained, M.P. 31°; cl. p. 47°.

In an analogous manner, there is produced with the corresponding diazoalkanes, the p-alkyl-p'-alkoxyazobenzenes set forth in Example 1, as well as p-alkyl-p'-alkoxyazoxybenzenes (from the corresponding p-alkyl-p'-hydroxyazoxybenzenes or p-hydroxy - p' - alkylazoxybenzenes).

EXAMPLE 3

(a) 260 g. of p-n-butyl-p'-hydroxyazobenzene is dissolved in a solution of 82 g. of KOH in 300 ml. of ethanol. Thereafter, 250 ml. of ethanol is distilled off and the reaction mixture is mixed with 500 ml. of acetone or ether, during which step the potassium salt of p-n-butyl-p'-hydroxyazobenzene is precipitated. The reaction mixture is filtered, dried, and pulverized. 250 g. of the potassium salt are suspended, together with 84 g. of NaHCO$_3$, in 750 ml. of acetone. At −15°, a solution of 145 g. of enanthic acid chloride in 100 ml. of acetone is added dropwise under agitation to this suspension. The mixture is stirred for another 5 minutes and then mixed with 1 liter of ice water. Then, the mixture is agitated for 5 minutes, and the thus-precipitated p-n-butyl-p-heptanoyloxyazobenzene is filtered and recrystallized from ethanol until the melting point and the clear point are constant; M.P. 52°; cl. p. 62°.

In place of the enanthic acid chloride, it is also possible to employ equivalent amounts of enanthic acid bromide or enanthic acid anhydride.

Analogously, the compounds set forth below are obtained from the p-alkyl-p'-hydroxyazobenzenes or p-alkyl-p'-hydroxyazoxybenzenes set forth in Example 1 (or from the isomeric p-hydroxy-p'-alkylazoxybenzenes) with the corresponding acid chlorides, acid bromides, or acid anhydrides:

p-methyl-p'-propionyloxyazobenzene
p-methyl-p'-butyryloxyazobenzene, M.P. 73.5°; cl. p. 74°
p-methyl-p'-valeryloxyazobenzene
p-methyl-p'-heptanoyloxyazobenzene, M.P. 63°; cl. p. 61°
p-ethyl-p'-butyryloxyazobenzene, M.P. 56°; cl. p. 57°
p-ethyl-p'-valeryloxyazobenzene, M.P. 47°; cl. p. 57°
p-ethyl-p'-capronyloxyazobenzene, M.P. 41°; cl. p. 60°
p-ethyl-p'-heptanoyloxyazobenzene, M.P. 46.5°; cl. p. 55° p-ethyl-p'-octanoyloxyazobenzene, M.P. 50°; cl. p. 62.5°
p-ethyl-p'-nonanoyloxyazobenzene, M.P. 55°; cl. p. 60.5°
p-n-propyl-p'-butyryloxyazobenzene, M.P. 60°; cl. p. 80°
p-n-propyl-p'-valeryloxyazobenzene, M.P. 54.5°; cl. p. 69°
p-n-propyl-p'-capronyloxyazobenzene, M.P. 49°; cl. p. 76°
p-n-propyl-p'-heptanoyloxyazobenzene, M.P. 42°; cl. p. 71°
p-n-propyl-p'-octanoyloxyazobenzene, M.P. 49°; cl. p. 76°
p-n-propyl-p'-nonanoyloxyazobenzene, M.P. 57°; cl. p. 73°
p-n-butyl-p'-acetoxyazobenzene
p-n-butyl-p'-propionyloxyazobenzene
p-n-butyl-p'-butyryloxyazobenzene, M.P. 49°; cl. p. 64.5°
p-n-butyl-p'-valeryloxyazobenzene, M.P. 62°; cl. p. 63°
p-n-butyl-p'-capronyloxyazobenzene, M.P. 59°; cl. p. 66°
p-n-butyl-p'-octanoyloxyazobenzene, M.P. 49°; cl. p. 68°
p-n-butyl-p'-nonanoyloxyazobenzene, M.P. 53°; cl. p. 67°
p-n-butyl-p'-decanoyloxyazobenzene
p-n-pentyl-p'-butyryloxyazobenzene
p-n-pentyl-p'-valeryloxyazobenzene
p-n-pentyl-p'-capronyloxyazobenzene
p-n-pentyl-p'-heptanoyloxyazobenzene
p-n-pentyl-p'-octanoyloxyazobenzene
p-n-pentyl-p'-nonanoyloxyazobenzene
p-n-hexyl-p'-butyryloxyazobenzene
p-n-hexyl-p'-valeryloxyazobenzene
p-n-hexyl-p'capronyloxyazobenzene
p-n-hexyl-p'-heptanoyloxyazobenzene
p-n-hexyl-p'-octanoyloxyazobenzene
p-n-hexyl-p'-nonanoyloxyazobenzene
p-methyl-p'-propionyloxyazoxybenzene
p-methyl-p'-butyryloxyazoxybenzene
p-methyl-p'-valeryloxyazoxybenzene
p-methyl-p'-heptanoyloxyazoxybenzene, MP. 62°; cl. p. 93°
p-ethyl-p'-butyryloxyazoxybenzene, M.P. 40°; cl. p. 78°
p-ethyl-p'-valeryloxyazoxybenzene, M.P. 26.5°; cl. p. 67°
p-ethyl-p'-capronyloxyazoxybenzene, M.P. 47°; cl. p. 77.5°
p-ethyl-p'-heptanoyloxyazoxybenzene, M.P. 50°; cl. p. 73°
p-ethyl-p'-octanoyloxyazoxybenzene, M.P. 51°; cl. p. 80°
p-ethyl-p'-nonanoyloxyazoxybenzene, M.P. 52° cl. p. 78°
p-n-propyl-p'-butyryloxyazoxybenzene, M.P. 54°; cl. p. 97.5°
p-n-propyl-p'-valeryloxyazoxybenzene, M.P. 39°; cl. p. 85°
p-n-propyl-p'-capronyloxyazoxybenzene, M.P. 49°; cl. p. 93°
p-n-propyl-p'-heptanoyloxyazoxybenzene, M.P. 31.5°; cl. p. 87.5°
p-n-propyl-p'-octanoyloxyazoxybenzene, MP. 41°; cl. p. 92°
p-n-propyl-p'-nonanoyloxyazoxbenzene, M.P. 38°; cl. p. 89°
p-n-butyl-p'-acetoxyazoxybenzene
p-n-butyl-p'-propionyloxyazoxybenzene
p-n-butyl-p'-butyryloxyazoxybenzene, M.P. 44°; cl. p. 85°
p-n-butyl-p'-valeryloxyazoxybenzene, M.P. 48°; cl. p. 76°
p-n-butyl-p'-capronyloxyazoxybenzene, M.P. 43.5°; cl. p. 83°
p-n-butyl-p'-heptanoyloxyazoxybenzene, M.P. 36°; cl. p. 80°
p-n-butyl-p'-octanoyloxyazoxybenzene, M.P. 36°; cl. p. 85.5°
p-n-butyl-p'-nonanoyloxyazoxybenzene
p-n-butyl-p'-decanoyloxyazoxybenzene
p-n-pentyl-p'-butyryloxyazoxybenzene
p-n-pentyl-p'-valeryoxyazoxybenzene
p-n-pentyl-p'-capronyloxyazoxybenzene
p-n-pentyl-p'-heptanoyloxyazoxybenzene
p-n-pentyl-p'-octanoyloxyazoxybenzene
p-n-pentyl-p'-nonanolyoxyazoxybenzene
p-n-hexyl-p'-butyryloxyazoxybenzene
p-n-hexyl-p'-valeryloxyazoxybenzene
p-n-hexyl-p'-capronyloxyazoxybenzene
p-n-hexyl-p'-heptanoyloxyazoxybenzene
p-n-hexyl-p'-octanoyloxyazoxybenzene
p-n-hexyl-p'-nonanoyloxyazoxybenzene
(or the isomeric p-acyloxy-p'-alkylazoxybenzenes).

(b) Analogously to Example 1(b), the p-alkyl-p'-acyloxyazoxybenzenes set forth under (a) (or the isomeric p-acyloxy-p'-alkylazoxybenzenes) are obtained by oxidizing the aforementioned p-alkyl-p'-acyloxyazobenzenes with hydrogen peroxide.

EXAMPLE 4

25.4 g. of p-n-butyl-p'-hydroxyazobenzene is dissolved in 100 ml. of 4% sodium hydroxide solution, and 400 ml. of ether is added thereto. Under vigorous agitation, a solution of 15 g. enanthic acid chloride in 20 ml. of ether is added dropwise thereto at —1°. The reaction mixture is stirred for one hour under cooling, and at the same time 30 ml. of 4% sodium hydroxide solution is added dropwise thereto so that a pH of 11–12 is maintained. The reaction mixture is filtered, the ether phase is separated, and the aqueous phase is washed several times with ether. The collected ether fractions are washed several times with water, dried, filtered, and concentrated. Under ice cooling, petroleum ether is added to the reaction mixture, thus precipitating p-n-butyl-p'-heptanoyloxyazobenzene, which is recrystallized several times from ethanol; M.P. 52°; cl. p. 62°.

EXAMPLE 5

5 g. of p-n-butyl-p'-hydroxyazobenzene is dissolved in 45 ml. of dimethylformamide; 4.2 g. of calcined potassium carbonate is added thereto, and a solution of 3 g. of enanthic acid chloride in 20 ml. of dimethylformamide is added to the reaction mixture under agitation at room temperature in a dropwise fashion. Thereafter, the reaction mixture is heated for 3 hours to 80°, cooled, mixed with 150 ml. of ether, and filtered. Under ice cooling, 90 ml. of water is added thereto and the mixture thoroughly shaken several times. The phases are separated; the aqueous phase is washed with ether, the combined ether extracts are shaken several times with water, dried, and evaporated, thus obtaining p-n-butyl-p'-heptanoyloxyazobenzene, M.P. 52°; cl. p. 62°.

EXAMPLE 6

5 g. of p-n-butyl-p'-hydroxyazobenzene is dissolved in 50 ml. of pyridine, and 3 g. of enanthic acid anhydride is added dropwise thereto under stirring. Thereafter, the reaction mixture is heated to 80° for 2 hours, cooled, 100 ml. of ether is added thereto, the mixture is filtered, mixed with 100 ml. of water, and the phases are separated. The aqueous phase is extracted several times with ether, the ether extracts are washed neutral with water, dried, and evaporated, thus obtaining p-n-butyl-p'-heptanoyloxyazobenzene, M.P. 52°; cl. p. 62°.

EXAMPLE 7

1.6 g. of p-n-butyl-nitrosobenzene and 1.1 g. of p-anisidine in 50 ml. of glacial acetic acid are heated for 4 hours to 80° C. Then, the reaction mixture is cooled, and the thus-precipitated p - n - butyl - p'-methoxyazobenzene is filtered. From the mother liquor, by concentration and addition of benzene, additional amounts of product can be isolated; M.P. 31°; cl. p. 47°.

EXAMPLE 8

By heating a solution of 1.5 g. of p-n-butylaniline (obtainable by Friedel-Crafts acylation of acetanilide with butyryl chloride to p-acetamidobutyrophenone and reduction according to Wolff-Kishner, during which reaction saponification occurs simultaneously) and 1.1 g. of p-nitrosoanisole in 50 ml. of glacial acetic acid to 80° for 4 hours, p-n-butyl-p'-methoxyazobenzene is obtained, M.P. 31°; cl. p. 47°.

EXAMPLE 9

1.49 g. of p-n-butylaniline and 1.23 g. of p-anisidine are heated together with 4 g. of sodium perborate tetrahydrate and 1 g. of boric acid in 50 ml. of acetic acid for 6 hours to 50–60°, under agitation. The reaction mixture is then cooled, filtered, washed neutral with water, and the thus-obtained products are separated by chromatography on aluminum oxide, the middle fraction thus-obtained being p-n-butyl-p'-methoxyazobenzene, M.P. 31°; cl. p. 47°.

EXAMPLE 10

A mixture of 15 g. of p-n-butylaniline and 12 g. of p-anisidine is dissolved in 500 ml. of dry benzene and boiled for 8 hours with 95 g. of active manganese dioxide (freshly prepared from manganese(II) sulfate and potassium permanganate). After filtration, the reaction mixture is chromatographed on aluminum oxide, thus obtaining p-n-butyl-p'-methoxyazobenzene, M.P. 31°; cl. p. 47°.

EXAMPLE 11

2.7 g. of p-n-butyl-p'-methoxyhydrazobenzene (obtainable by reducing a benzene-diluted mixture of equimolar portions of p-n-butyl-nitrobenzene and p-nitroanisole with zinc in sodium hydroxide solution) is dissolved in 50 ml. of 10% sodium hydroxide solution and mixed dropwise with 2 g. of bromine at room temperature and under agitation. The reaction mixture is stirred for another hour at room temperature, then neutralized with dilute hydrochloric acid, and p-n-butyl-p'-methoxyazobenzene is thus obtained, M.P. 31°; cl. p. 47°.

The other p-alkyl-p'-alkoxyazobenzenes set forth in Example 1 are produced analogously.

EXAMPLE 12

Air at a rate of 6 bubbles per second is passed, under agitation, for 24 hours through a solution of 2.7 g. of p-n-butyl-p'-methoxyhydrazobenzene in 50 ml. of 10% sodium hydroxide solution. Thereafter, the reaction mixture is neutralized with dilute hydrochloric acid, thus obtaining p-n-butyl-p'-methoxyazobenzene, M.P. 31°; cl. p. 47°.

EXAMPLE 13

2.7 g. of p-n-butyl-p'-methoxyhydrazobenzene is heated, together with 40 ml. of nitrobenzene, for 2 hours to 180° and then refluxed for 30 minutes. Upon cooling, p-n-butyl-p'-methoxyazobenzene precipitates, M.P. 31°; cl. p. 47°.

EXAMPLE 14

18 g. of p-nitro-n-butylbenzene and 15 g. of p-nitroanisole are dissolved in 200 ml. of xylene and added dropwise, under boiling, to a suspension of 11 g. of dry sodium methylate in 260 ml. of xylene. Then, the reaction mixture is refluxed for 7 hours, mixed, after cooling, with 600 ml. of water, the xylene is distilled off, the reaction mixture cooled to 0°, filtered, and recrystallized several times from ethanol. The reaction product is p-n-butyl-p'-methoxyazoxybenzene (or p-methoxy-p'-n-butylazoxybenzene); M.P. 16°; cl. p. 76°.

The p-alkyl-p'-alkoxyazoxybenzenes (or the p-alkoxy-p'-alkylazoxybenzenes) set forth in Example 1 are obtained in an analogous manner.

EXAMPLE 15

18 g. of p-nitro-n-buytlbenzene and 18 g. of p-acetoxynitrobenzene are reacted with sodium methylate analogously to Example 14. Upon cooling of the xylene solution, the sodium salt of p-n-butyl-p'-hydroxyazoxybenzene (or p-hydroxy-p'-n-butylazoxybenzene) precipitates, which salt is suspended in 100 ml. of acetone, together with 9 g. of NaHCO₃. At −15°, a solution of 13.6 g. of caproic acid chloride in 20 ml. of acetone is added dropwise under stirring to this suspension. After 5 minutes, the reaction solution is mixed with 100 ml. of ice water, and the thus-precipitated p-n-butyl-p'-capronyloxyazoxybenzene (or p-capronyloxy-p'-n-butylazoxybenzene; M.P. 43.5°; cl. p. 83° is filtered.

Analogously, the p-alkyl-p'-alkanoyloxyazoxybenzenes (or p-alkanoyloxy-p'-alkylazoxybenzenes) mentioned in Example 3 are prepared.

EXAMPLE 16

10.9 g. of p-anisidine is diazotized in a hydrochloric solution with sodium nitrite. The solution of the diazonium salt is mixed, under vigorous agitation at +5°, with 15 g. of n-butylbenzene, during which procedure p-n-butyl-p'-methoxyazobenzene precipitates; M.P. 31°; cl. p. 47°.

EXAMPLE 17

16.5 g. of N-(p-n-butylphenyl)-hydroxylamine and 26.3 g. of p-nitrosophenyl-n-decyl ether are refluxed for 2 hours in 150 ml. of 5% ethanolic potassium hydroxide solution. Then, the alcohol is completely evaporated, the residue taken up in 50 ml. of benzene, washed neutral with water, evaporated, and the oily residue is recrystallized several times at −15° from ethanol, thus obtaining p-n-butyl-p'-n-decyloxyazoxybenzene.

In the following examples, mixtures of binary systems according to the invention are set forth, along with their nematic ranges which are thermodynamically stable.

The mixtures, in each case, contain at least one compound according to the present invention. They can readily be subcooled to temperatures ranging still below the disclosed melting point. The percentages listed herein are percent by weight. The mixtures set forth below are eutectic ones. Binary mixtures contain preferably 60–70 percent by weight of one component and 40–30 percent by weight of the second component.

EXAMPLE A

62% p-n-butyl-p'methoxyazoxybenzene (or p-methoxy-p'-n-butylazoxybenzene)
38% p-n-butyl-p'-n-butyloxyazoxybenzene (or p-n-butyloxy-p'-n-butylazoxybenzene)

M.P. −6°
cl. p. 81°

EXAMPLE B

65% p-n-butyl-p'-methoxyoxyazoxybenzene (or p-methoxy-p'-n-butylazoxybenzene)
35% p-n-butyl-p'-n-hexyloxyazoxybenzene (or p-n-hexyloxy-p'-n-butylazoxybenzene)

M.P. −15°
cl. p. 85°

EXAMPLE C

67% p-n-butyl-p'-methoxyazoxybenzene (or p-methoxy-p'-n-butylazoxybenzene)
33% p-n-propyl-p'-heptanoyloxyazoxybenzene or p-heptanoyloxy-p'-n-propylazoxybenzene)

M.P. −7°
cl. p. 79°

EXAMPLE D

68% p-n-butyl-p'-methoxyazoxybenzene (or p-methoxy-p'-n-butylazoxybenzene)
32% p-ethyl-p'-valeryloxyazoxybenzene or p-valeryloxy-p'-ethylazoxybenzene)

M.P. −9°
cl. p. 73°

The example of application below describes one of the uses of the compounds of this invention.

EXAMPLE OF APPLICATION

A thin film of one of the above-mentioned compounds of Formula I or a mixture of two or more thereof, e.g., wherein R is n-butyl, R' is methoxy and X is azoxy, or a composition of Example A, B, C or D, is applied as a coating of a thickness of 5–20μ, between two light-permeable conductive glasses provided with contacts. Applying a direct voltage of, for example, between 5 and 20 volts is applied to this unit, the previously transparent plate system becomes increasingly opaque with increasing voltage. This process is reversible at will within the entire temperature range of the nematic phase of the compounds forming the coating. If one of the glass plates is provided with a conductive electrode raster in place of a conductive surface coating, this pattern becomes visible when the voltage is applied. Such an arrangement is illustrative of the principle of a flat image reproduction unit.

The compounds and compositions of this invention are used analogously to other nematic compounds and compositions described in the literature, such as, f.e. Appl. Physics Letters, 13, 46 (1968); Scientific American, 222, 100 (1970) (dynamic scattering in electronic devices, construction and manufacture of such devices); furthermore: Zeitschrift für Naturforschung, 20a, 572 (1965); 23a, 152 (1968); Osterr. Chem.-Ztg., 68, 113 (1967) (use of nematic liquid crystals in nuclear reasonance spectroscopy).

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A compound of the formula

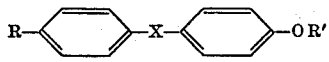

wherein X is azoxy, R is straight-chain alkyl of 1-8 carbon atoms and R' is straight-chain alkyl of 1-10 carbon atoms or straight-chain alkanoyl of 2-10 carbon atoms.

2. A compound of claim 1, wherein R contains 2-4 carbon atoms.
3. A compound of claim 1, wherein R is n-butyl.
4. A compound of claim 1, wherein R' is alkyl of 1-6 carbon atoms.
5. A compound of claim 4, wherein R contains 2-4 carbon atoms.
6. A compound of claim 4 wherein R is ethyl.
7. A compound of claim 6 wherein R' is methyl.
8. A compound of claim 6 wherein R' is ethyl.
9. A compound of claim 6 wherein R' is n-propyl.
10. A compound of claim 6 wherein R' is n-butyl.
11. A compound of claim 6 wherein R' is n-pentyl.
12. A compound of claim 6 wherein R' is n-hexyl.
13. A compound of claim 4 wherein R is n-propyl.
14. A compound of claim 13 wherein R' is methyl.
15. A compound of claim 13 wherein R' is ethyl.
16. A compound of claim 13 wherein R' is n-propyl.
17. A compound of claim 13 wherein R' is n-butyl.
18. A compound of claim 13 wherein R' is n-pentyl.
19. A compound of claim 13 wherein R' is n-hexyl.
20. A compound of claim 4 wherein R is n-butyl.
21. A compound of claim 20 wherein R' is methyl.
22. A compound of claim 20 wherein R' is ethyl.
23. A compound of claim 20 wherein R' is n-propyl.
24. A compound of claim 20 wherein R' is n-butyl.
25. A compound of claim 20 wherein R' is n-pentyl.
26. A compound of claim 20 wherein R' is n-hexyl.
27. A compound of claim 1, wherein R' is alkanoyl of 4-8 carbon atoms.
28. A compound of claim 27, wherein R contains 2-4 carbon atoms.
29. A compound of claim 27 wherein R is ethyl.
30. A compound of claim 29 wherein R' is n-butyloyl.
31. A compound of claim 29 wherein R' is n-pentyoyl.
32. A compound of claim 29 wherein R' is n-hexyloyl.
33. A compound of claim 29 wherein R' is n-heptoyl.
34. A compound of claim 29 wherein R' is n-octoyl.
35. A compound of claim 27 wherein R is n-propyl.
36. A compound of claim 35 wherein R' is n-butyloyl.
37. A compound of claim 35 wherein R' is n-pentyloyl.
38. A compound of claim 35 wherein R' is n-hexyloyl.
39. A compound of claim 35 wherein R' is n-heptoyl.
40. A compound of claim 35 wherein R' is n-octoyl.
41. A compound of claim 27 wherein R is n-butyl.
42. A compound of claim 41 wherein R' is n-butyloyl.
43. A compound of claim 41 wherein R' is n-pentyloyl.
44. A compound of claim 41 wherein R' is n-hexyloyl.
45. A compound of claim 41 wherein R' is n-heptoyl.
46. A compound of claim 41 wherein R' is n-octoyl.

References Cited
UNITED STATES PATENTS 3,532,642  10/1970  Furukawa et al. ____ 260—143 X
3,467,688   9/1969  Bennett et al. _____ 260—143 X LEWIS GOTTS, Primary Examiner C. F. WARREN, Assistant Examiner U.S. Cl. X.R.

252—408; 260—206, 207.1; 350—160 R